United States Patent [19]

Alvarez

[11] 4,382,402

[45] May 10, 1983

[54] PORTABLE COFFEE MAKER

[76] Inventor: Donald E. Alvarez, 17256 Akita Ct., Strongsville, Ohio 44136

[21] Appl. No.: 292,231

[22] Filed: Aug. 12, 1981

Related U.S. Application Data

[63] Continuation-in-part of Ser. No. 250,021, Apr. 1, 1981, abandoned.

[51] Int. Cl.³ ............................................. H47J 31/34
[52] U.S. Cl. ........................................ 99/295; 99/307
[58] Field of Search ................. 99/295, 300, 304, 306, 99/307, 316, 321, 323, 282, 302 R, 307, 313, 314

[56] References Cited

U.S. PATENT DOCUMENTS

| | | | |
|---|---|---|---|
| 2,817,743 | 12/1957 | Foster | 99/282 |
| 3,384,004 | 5/1968 | Perlman | 99/295 |
| 3,450,024 | 6/1969 | Martin | 99/295 |
| 3,793,933 | 2/1974 | Weber | 99/302 |
| 3,844,206 | 10/1974 | Weber | 99/300 |
| 3,854,389 | 12/1974 | Hillemann | 99/306 |
| 3,996,846 | 12/1976 | Hupf | 99/307 |

*Primary Examiner*—Robert W. Jenkins
*Attorney, Agent, or Firm*—Hamilton, Renner & Kenner

[57] ABSTRACT

A portable coffee maker (10) is adapted to be used with a package of ground coffee (58) and a package of water (40). The coffee maker (10) includes a water heating chamber (12) and a coffee brewing chamber (14) Within the water heating chamber (12) is a device (38) to pierce the package of water (40) and a percolator (30) to heat the water (W) and direct it to the brewing chamber (14). The brewing chamber (14) included a tray (56) to hold the package of ground coffee (58) and a pedestal (60) to position a cup (62) therein to receive the brewed coffee (C).

17 Claims, 6 Drawing Figures

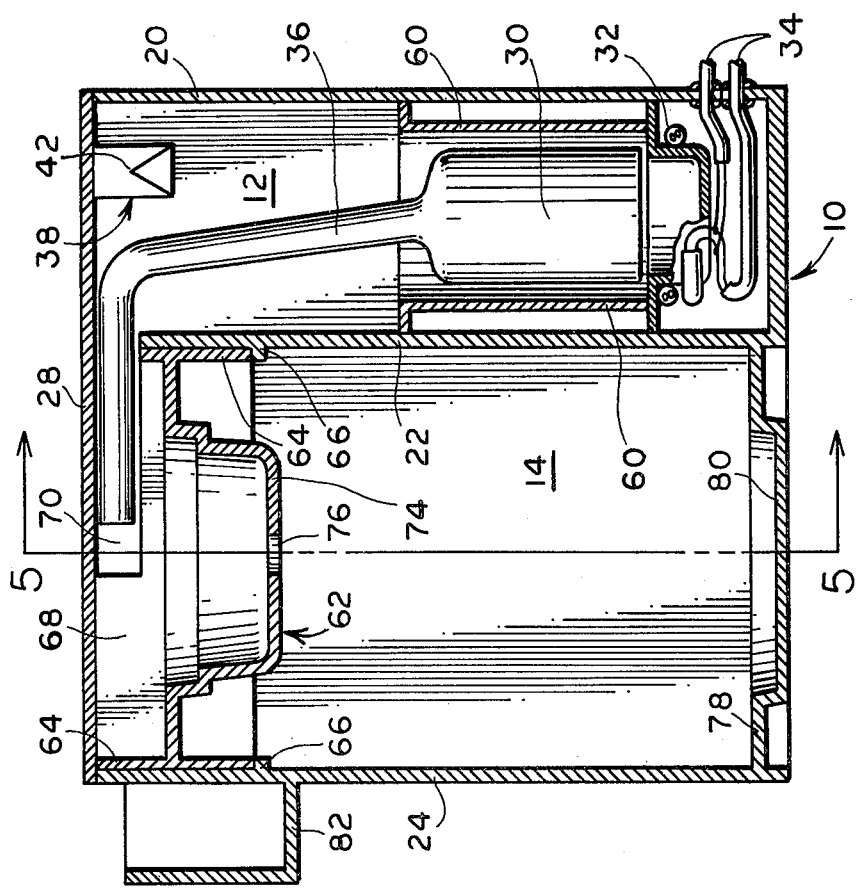
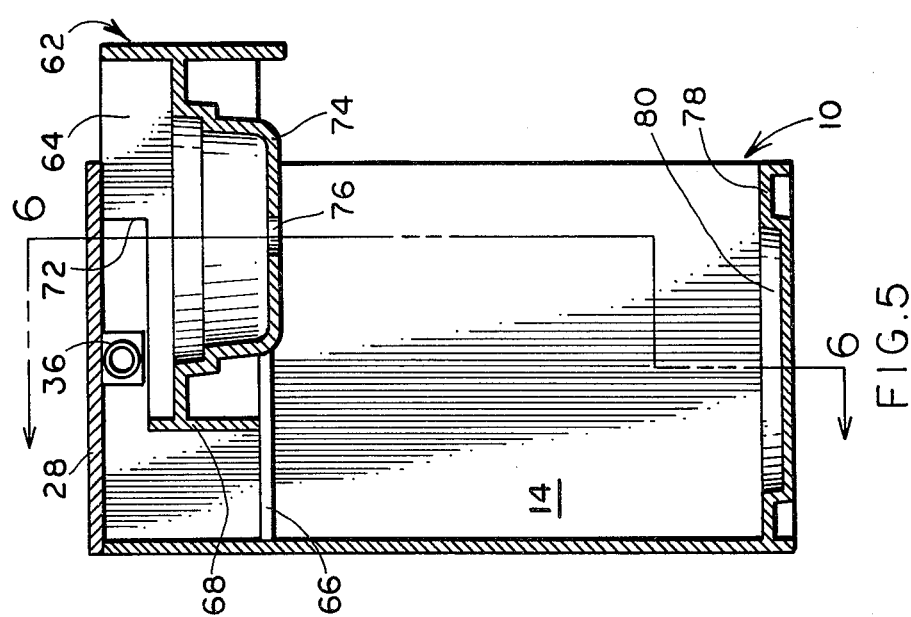

PORTABLE COFFEE MAKER

This application is a continuation-in-part of my prior, co-pending application, Ser. No. 250,021, filed Apr. 1, 1981, now abandoned.

TECHNICAL FIELD

This invention relates to a device for making coffee. More particularly, this invention relates to a portable device for making coffee from prepackaged ground coffee and prepackaged water and adaptable for use in an automotive vehicle or the like.

BACKGROUND ART

Relatively portable coffee makers for use in the home, office, or even restaurants have recently become quite popular for making an entire pot of coffee. However, this art has not become satisfactorily established for use in automotive vehicles where it is ususally convenient to make one cup of coffee at a time and where it is not convenient for the driver of the vehicle to be distracted by having to go through attentive procedures to make the coffee. Thus, it would not be practical for the operator of a vehicle to have to measure out coffee and water and deposit the same in the coffee maker while driving the vehicle. Nor would the driver usually want more than a single cup at a time. Further, the operator of the vehicle would usually like his coffee brewed quite quickly, at least in a time far shorter than known brewing techniques. Thus, the portable coffee making art has not been satisfactory expanded for use and operation in a moving vehicle.

DISCLOSURE OF THE INVENTION

It is thus a primary object of the present invention to provide a portable coffee maker which is readily adaptable for use in a vehicle.

It is another object of the present invention to provide a portable coffee maker, as above, which utilizes prepackaged water and ground coffee, preferrably in a one cup quantity, to minimize distraction of the operator of the vehicle.

It is an additional object of the present invention to provide a portable coffee maker, as above, which is supplied with a means to quickly heat the water for efficient coffee brewing.

It is a further object of the present invention to provide a portable coffee maker, as above, which is operable by power supplied by the vehicle battery.

These and other object of the present invention, which will become apparent from the description to follow, are accomplished by the means hereinafter described and claimed.

In general, a portable coffee maker is adapted to be used with a package of ground coffee and a package of water and includes a first chamber which receives the water to be heated. A piercing device is provided in the first chamber to perforate the package of water. The first chamber also includes means to heat the water which is placed therein. The coffee maker also includes a second or brewing chamber which receives the heated water from the first chamber. The second chamber includes means to hold the package of ground coffee in a position so that the heated water will pass therethrough. The second chamber is also provided with means to position a cup so that the brewed coffee will be received therein.

BRIEF DESCRIPTION OF THE DRAWINGS

FIG. 5 is generally a vertical section of an alternate embodiment of the portable coffee maker according to the present invention taken substantially along line 5—5 of FIG. 6, showing the coffee-holding tray partially opened.

FIG. 6 is generally a vertical section of the alternative embodiment of the portable coffee maker according to the present invention taken substantially along line 6—6 of FIG. 5.

PREFERRED EMBODIMENTS FOR CARRYING OUT THE INVENTION

Figure 1:
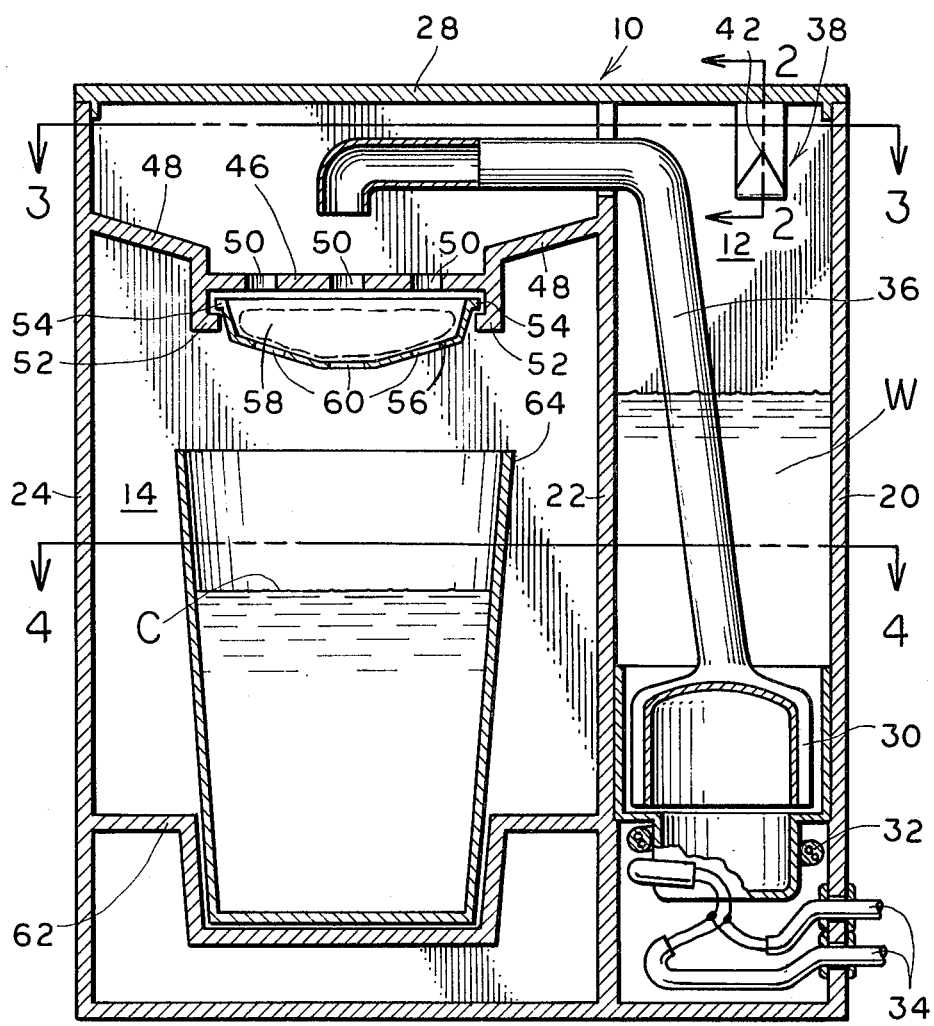
FIG. 1 is generally a vertical section of one embodiment of the portable coffee maker according to the present invention taken substantially along line 1—1 of FIG. 3 and showing a package of ground coffee in condition to be brewed in phantom.
Figure 3:
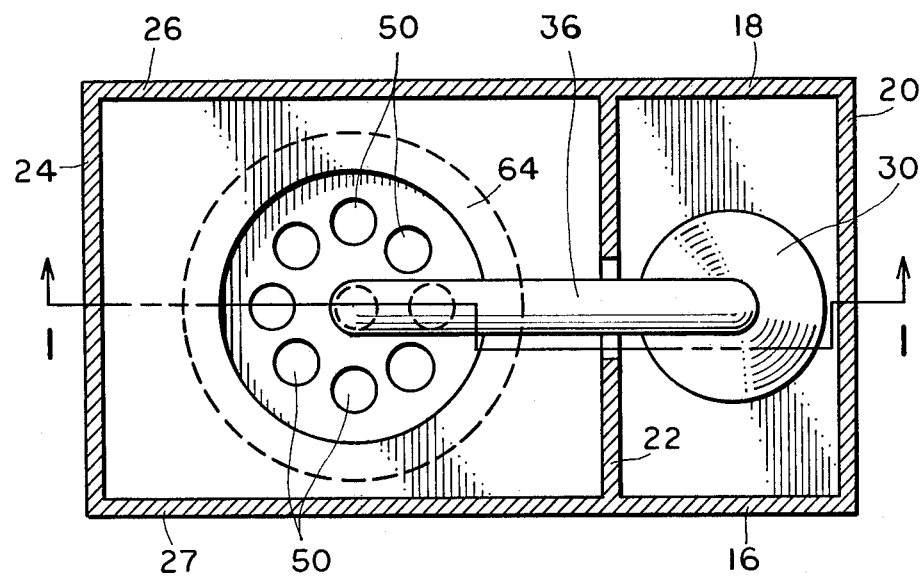
FIG. 3 is a horizontal sectional view taken substantially along line 3—3 of FIG. 1.
Figure 4:
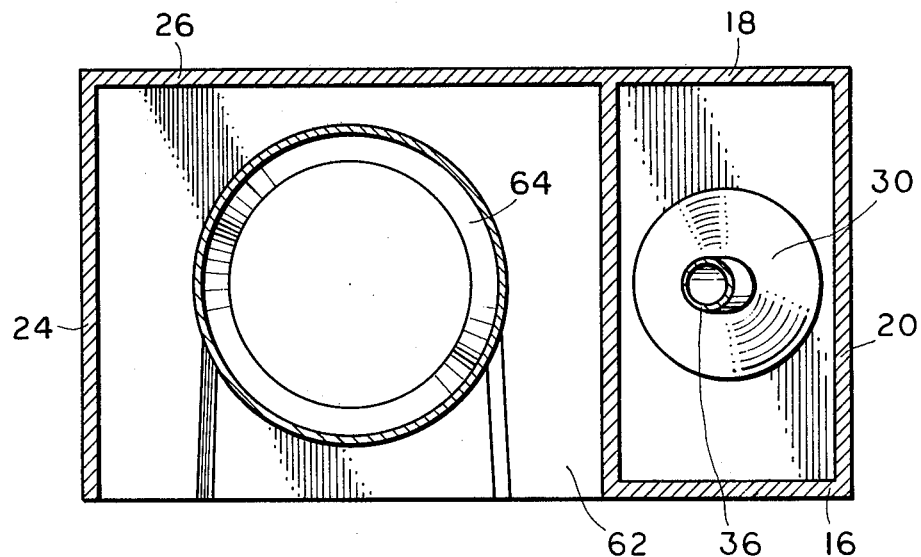
FIG. 4 is a horizontal sectional view taken substantially along line 4—4 of FIG. 1.

One embodiment of the portable coffee maker according to the concept of the present invention is indicated generally by the numeral 10 in FIG. 1 and includes a water heating chamber 12 and a coffee brewing chamber 14 adjacent to chamber 12. Water heating chamber 12 is totally enclosed and is defined by front wall 16 (FIG. 3), back wall 18 (FIG. 3), and sidewalls 20 and 22, with sidewall 22 being common to chamber 14. Brewing chamber 14 is also defined by sidewall 24 and back wall 26 (FIG. 3) but has only a partial front wall 27 (FIG. 3) and is otherwise open in the front as will hereinafter be described. A removable lid 28 covers both chambers 12 and 14.

Water heating chamber 12 is provided with a conventional perculator 30 which is heated by coils 32 connected to the power source in the vehicle by conductors 34. The outer end of conductors 34 may be provided with an adapter (not shown) so that they may be plugged into the cigarette lighter of the vehicle or if desired for home use, may be provided with an adapter for such. Perculator 30 also includes a discharge tube 36 which extends upward in chamber 12, through common wall 22, and into chamber 14 so that heated water may be delivered thereto.

Figure 2:
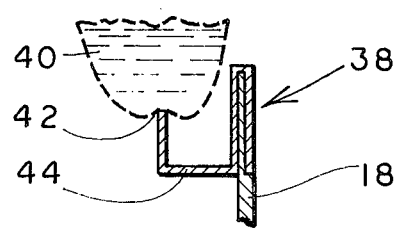
FIG. 2 is a sectional view taken substantially along line 2—2 of FIG. 1 showing a package of water about to be pierced in phantom.

Water heating chamber 12 is also provided with a piercing device indicated generally by the numeral 38 and shown in FIGS. 1 and 2. Piercing device 38 can be of any configuration as long as it is capable of puncturing a prepackaged, in plastic, container of water 40. As shown, piercing device 38 is in the form of a prong-like structure having a sharp point 42 extending into chamber 12 from back wall 18 on the end of a bracket 44. It should be evident that piercing device 38 could also be made to extend from any of the walls of chamber 12 so long as it provides a means to pierce the package of water 40. With lid 28 removed the sharp point 42 is readily exposed and the package 40 may be easily broken to admit water W into chamber 12 for subsequent heating by perculator 30. As will hereinafter be described in more detail, the package of water 40 most conveniently will hold an equivalent of one cup of water to make a single cup of coffee so that the operator of the vehicle is not distracted by having to measure the amount of water being deposited in chamber 12.

Suspended generally centrally in brewing chamber 14 is a water receiving plate 46 carried by arms 48 extending from sidewalls 22 and 24. Water received from chamber 12 is generally held on plate 46 inasmuch as this portion of chamber 14 is totally enclosed, front wall 27 extending downward from lid 28 to the level of plate 46. However, plate 46 is provided with a plurality of apertures 50 therein allowing the water received from discharge tube 36 of perculator 30 to evenly pass therethrough. Arms 48 also are formed at the lower end below the lowest point of front wall 27 as tray mounting brackets 52 onto which flanges 54 of a perforated tray 56 can be slid. Access to tray 56 is, of course, obtained through the front open end of chamber 14 below wall 27. A prepackaged container of ground coffee 58 can be placed in tray 56 which is then slid in place under plate 46. Like plate 46, tray 56 is provided with a plurality of apertures 60 or perforations which allow liquid (now coffee) to pass therethrough. As is the case with water package 40, the package of ground coffee 58 can most conveniently hold a predetermined amount of coffee grinds suitable for brewing a single cup of coffee so that the operator of the vehicle is not distracted by having to measure out the precise amount of coffee needed. In addition, by encasing the ground coffee in a filter-like package (in a tea bag-like fashion), the bag need not be pierced but rather merely conveniently placed intact into tray 56.

The bottom of chamber 14 is formed as a pedestal 62 generally having a U-shaped cavity therein into which an insulated cup 64 may be slid. Pedestal 62 is formed so that when cup 64 is slid all the way in to the full lateral extent of the cavity, it will be centered directly under tray 56 and receive the brewed coffee C therein.

A variation or alternative embodiment to the present invention is shown in FIGS. 5 and 6. The embodiment of FIGS. 5 and 6 is in many respects like that of FIGS. 1-4, inclusive, and where the embodiments are essentially identical, like numbers have been assigned to the various elements. As shown in FIG. 6 perculator 30 within chamber 12 is confined within cylindrical well 60, the diamter of which closely responds to the size of perculator 30. This water is quickly heated and passes through tube 36 to brewing chamber 14. Cooler water in chamber 12 is then heated within in the confines of well 60 and similarly passes to brewing chamber 14 until all the water is so heated.

Brewing chamber 14 includes a coffee holding tray, indicated generally by the numeral 62, which is slidable in and out of the open front of chamber 14. FIG. 5 shows tray 62 partially withdrawn from chamber 14. The upstanding side portions 64 of tray 62 ride on tracks 66 formed on walls 22 and 24 in chamber 14. As shown, the back wall 68 is notched, as at 70, and one side portion 64 notched, as at 72, to provide clearance for discharge tube 36. Tray 62 is formed with a centrally located well 74 which can hold the prepackaged coffee. An aperture 76 in well 74 allows the brewed coffee to drop into a cup (not shown) which is positioned on a pedestal 78 having a circular locating recess 80 therein.

As shown in FIG. 6 the coffee maker 10 may also be provided with an external compartment 82, open at the top, so that items such as the water or coffee containers, sugar or the like can be conveniently stored for ready access.

It should thus be appreciated that the operator of a vehicle can quickly and conveniently, without distraction, brew his own coffee in either embodiment of the coffee maker 10 just described. The operator can be provided, in a kit-like form, with a supply of water packages 40, coffee packages 58 and cups 64 to brew coffee merely by connecting the unit to the cigarette lighter, placing the coffee package and cup in place, and breaking the package of water on piercing device 38. The water will be quickly heated, particularly in the embodiment shown in FIGS. 5 and 6, because of the small area of water in direct contact with the perculator. It should be additionally appreciated that tea or other liquids, such as soups or the like, could be made in the same device just described. The objects of the invention are thereby accomplished substantially improving the portable coffee making art.

I claim:

1. A portable coffee maker adapted to be used with a package of ground coffee and a package of water to provide brewed coffee in a cup comprising, a first chamber defined by walls to receive water to be heated, a second chamber defined by walls for brewing the coffee, first means in said first chamber to pierce the package of water, second means in said first chamber to heat the water and direct the same to said second chamber, first means in said second chamber to hold the package of ground coffee in position to permit the heated water received from said first chamber to pass therethrough, and second means in said second chamber to position the cup below said first means in said second chamber to receive brewed coffee therein.

2. A portable coffee maker according to claim 1 wherein said first means in said first chamber includes a pointed member extending from one of said walls of said first chamber.

3. A portable coffee maker according to claim 2 wherein said pointed member is mounted near the top of said first chamber.

4. A portable coffee maker according to claim 1 wherein said second means in said first chamber includes a perculator.

5. A portable coffee maker according to claim 4, further comprising a well in said first chamber closely surrounding said perculator so that only a small amount of water will communicate with said perculator.

6. A portable coffee maker according to claim 4 wherein said first and second chambers have a common wall and said second means in said first chamber further includes tubing extending from said perculator, through said common wall, and into said second chamber.

7. A portable coffee maker according to claim 1 further comprising third means in said second chamber to receive the heated water from said second means in said first chamber.

8. A portable coffee maker according to claim 7 wherein said second chamber has one open wall and said first means in said second chamber is a tray slidable into said second chamber through said open wall to a position beneath said third means.

9. A portable coffee maker according to claim 8 wherein both said third means and said tray are perforated.

10. A portable coffee maker according to claim 8 further comprising at least one arm member extending from at least one wall of said second chamber, said arm member supporting said third means.

11. A portable coffee maker according to claim 10 further comprising at least one bracket having flanges supported by said arm member, said tray being slidable on said flanges.

12. A portable coffee maker according to claim 1 wherein said second chamber has one open wall and said second means in said second chamber includes a pedestal having a U-shaped cavity therein into which the cup is slid through said open wall.

13. A portable coffee maker according to claim 12 wherein the lateral extent of said U-shaped cavity determines the position of the cup in said second chamber so that the cup is positioned below said first means in said second chamber.

14. A portable coffee maker according to claim 1 wherein said first and second chambers have a common wall and further comprising lid means covering both said first and second chambers.

15. A portable coffee maker according to claim 1 wherein the package of water includes a pierceable plastic package and a quantity of water sufficient to fill the cup.

16. A portable coffee maker according to claim 1 wherein the package of ground coffee includes a filter-like package and a quantity of ground coffee sufficient to make one cup of coffee.

17. A portable coffee maker according to claim 1 further comprising an open compartment on the outside of said chambers.

* * * * *